May 2, 1950     K. R. LARSON     2,506,027
PIN HAVING A SAFETY CATCH
Filed Nov. 17, 1945
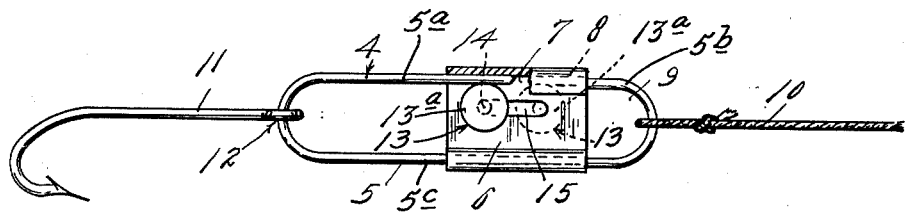
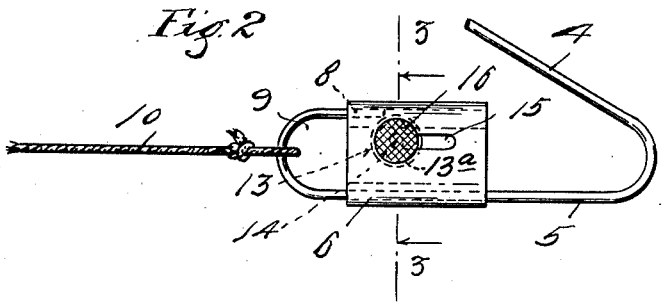
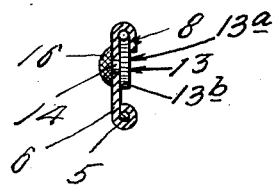
INVENTOR
*Karl R. Larson*
BY *Harry D. Kilgore*
ATTORNEY Patented May 2, 1950

2,506,027

UNITED STATES PATENT OFFICE 2,506,027

PIN HAVING A SAFETY CATCH

Karl R. Larson, Minneapolis, Minn., assignor to The Paul Bunyan Bait Company, Minneapolis, Minn., a corporation of Minnesota Application November 17, 1945, Serial No. 629,302

1 Claim. (Cl. 24—158)

My present invention relates to improvements in pins and, more particularly, to a pin of the so-called safety-type for attaching a fishhook to a line.

It is well known that such pins are often opened, by the struggle of a hooked fish while trying to land it, with a result that the hook is released from the line and the fish lost.

The object of this invention is to provide a safety catch for positively holding a pin closed.

To the above end, the invention consists of the novel devices and combination of devices hereinafter described and defined in the claim.

In the accompanying drawing, which illustrates the invention, like characters indicate like parts throughout the several views.

Referring to the drawing:

Fig. 1 is a view principally in side elevation showing a fishhook attached to a line by a pin having the invention embodied therein, and also showing a portion of the guard broken away and sectioned;

Fig. 2 is a view corresponding to Fig. 1, but showing the other side of the pin in an open position with the hook removed; and Fig. 3 is a sectional view taken on the line 3—3 of Fig. 2.

The numerals 4, 5 and 6 indicate, respectively, the pin proper, its body and a guard. The pin 4 and its body 5 are formed of a single piece of spring wire, which, when the pin is closed, is in the form of an elongated loop having semi-circular end portions. One of the sides of this loop is formed by the end portions 5a and 5b of the wire and there is a gap 7 therebetween. The end portion 5a of the wire is relatively long and affords the pin 4.

The guard 6, which is formed of a flat piece of material, extends transversely of the body 5, substantially in the plane thereof. One of the end portions of the guard 6 is secured to the integral side 5c of the body 5 by being rolled therearound with sufficient friction to positively hold it in position. The other end portion of the guard 6 is folded upon itself to form a retaining channel 8. The short end portion 5b of the wire is held in the channel 8, and the respective end portion of the loop and the guard 6 form an eye 9. When the pin 4 is closed, it lies in the channel 8, and at which time the guard 6 spans the gap 7. While closing the pin 4, the guard 6 will direct it into the retaining channel 8. From a broad viewpoint, the guard 6 forms a part of the body.

The pin is attached to a line 10 that is inserted through the eye 9 and tied. A fishhook 11 is attached to the line 10 by inserting the pin 4 through the eye 12 in the shank of the hook 11 and closing said hook.

The pin 4 is positively held closed by a catch 13 that includes a friction disk 13a that extends parallel to the guard 6 and into the channel 8 for peripheral contact with the pin 4. This disk 13a has a short axially aligned stud 14 that extends through an elongated slot 15 in the guard 6 that is parallel to the channel 8. Fixed on the stud 14 is a knurled button that affords a finger-piece 16 by which the disk 13a may be moved into and out of engagement with the pin 4. This finger-piece 16 is on the opposite side of the guard 6 from the disk 13a. The stud 14 holds the disk 13a and the finger-piece 16 with a working clearance relative to the guard 6. The periphery of the disk 13a has therein fine serrations 13b to facilitate the holding action of said disks.

When the pin 4 is closed and the disk 13a positioned thereunder, said pin is frictionally pinched between said disk and the bottom of the channel 8 and is thereby positively held closed. Obviously, the disk 13a is free to rotate and be moved bodily, which facilitates its movement into and out of engagement with the pin 4.

While the safety catch 13 is being moved into an operative position onto the pin 4, the disk 13a by its engagement with the end of said pin, will be rolled onto the pin 4 and thereby produces a pressure that will positively hold said disk where positioned on the pin 4.

From what has been said, it will be understood that the invention described is capable of various modifications within the scope of the invention herein disclosed and claimed.

What I claim is:

In a catch of the class described, a stiff spring wire in the form of an elongated loop in which the end portions of the wire form one side member of the loop, a guard in the form of a flat plate extending transversely of the loop and rigidly secured at one of its longitudinal edge portions to the integral side member of the loop, the other longitudinal edge portion of the guard having a channel, one of the end portions of the wire being in the channel and the other end portion thereof affording a pin normally projecting obliquely outwardly for springing movement into and out of the channel, said guard having a slot extending substantially parallel to the channel, a shaft extending through the slot and having on its inner end a disk in the plane of the loop and of a diameter to frictionally engage the pin when in the channel and press the same onto the bottom of the channel, and a finger piece on the outer end of the shaft, said shaft being free in the slot for rolling and sliding movement to move the disk longitudinally on the pin.

KARL R. LARSON.

REFERENCES CITED

The following references are of record in the file of this patent:

UNITED STATES PATENTS

| Number | Name | Date |
|---|---|---|
| 201,531 | Jenkins | Mar. 19, 1878 |
| 630,972 | Capewell, Jr. | Aug. 15, 1899 |
| 628,598 | Clark | July 11, 1899 |

FOREIGN PATENTS

| Number | Country | Date |
|---|---|---|
| 236,132 | Germany | July 1, 1911 |
| 412,145 | France | Apr. 16, 1910 |
| 535,489 | Germany | Oct. 15, 1931 |